US005372335A

United States Patent [19]

[11] Patent Number: 5,372,335

[45] Date of Patent: Dec. 13, 1994

Yenzer et al.

[54] AERIAL MARKER BALL AND METHOD OF PLACEMENT

[75] Inventors: Scott H. Yenzer, 5445 SW. 105 St., Miami, Fla. 33156; Pasquale Patullo, Hollywood, Fla.

[73] Assignee: Scott H. Yenzer, Miami, Fla.

[21] Appl. No.: 992,401

[22] Filed: Dec. 18, 1992

[51] Int. Cl.[5] .......... B64B 1/50

[52] U.S. Cl. .......... 244/33; 244/114 R; 116/209; 116/210; 340/983; 342/10

[58] Field of Search .......... 244/31, 33, 1 R, 114 R; 116/209, 210; 342/10; 343/18; 340/983; 254/134, 3 R; 248/324

[56] References Cited

U.S. PATENT DOCUMENTS

| | | | |
|---|---|---|---|
| 2,085,077 | 6/1937 | Fox et al. | 116/209 |
| 3,007,437 | 11/1961 | Adair | 116/209 |
| 3,217,325 | 11/1965 | Mullin | 343/18 |
| 3,276,017 | 9/1966 | Mullin | 343/18 |
| 3,470,845 | 10/1969 | Mignano | 160/210 |
| 3,683,843 | 8/1972 | Schlein | 116/209 |
| 3,938,466 | 2/1976 | Crissman | 110/210 |
| 4,166,602 | 9/1979 | Nilsen et al. | 248/324 |
| 4,365,772 | 12/1982 | Ferguson | 244/33 |
| 4,474,133 | 10/1984 | Anderson et al. | 116/209 |
| 4,637,575 | 1/1987 | Yenzer . | |
| 4,885,835 | 12/1989 | Osgood | 116/209 |
| 5,224,440 | 7/1993 | Cox | 116/209 |

*Primary Examiner*—Galen L. Barefoot

*Attorney, Agent, or Firm*—Burns, Doane, Swecker & Mathis

[57] ABSTRACT

An aerial marker device includes a bracket to attach the device to an elevated structure such as a power line. A body is attached to the bracket and includes an outer envelope which is inflatable to provide the desired shape of the aerial marker device.

34 Claims, 3 Drawing Sheets

AERIAL MARKER BALL AND METHOD OF PLACEMENT

The present invention relates to aerial marker devices such as those used to identify the location of elevated structures.

Aerial marker devices are frequently used to identify power cables, guylines, antennas and similar elevated structures which otherwise might go undetected and pose a potential hazard to air, ground or water navigation. The aerial marker devices conventionally used consist of a spherical body and an attachment bracket to secure the body to a cable. These aerial marker devices are attached periodically along the length of the structure and are usually of high visibility so that they may be seen from a significant distance.

The aerial marker devices are conventionally formed from a pair of hemispherical self-supporting shells which are bolted together along an equator. The devices may vary in diameter depending upon the application but are typically between 18 and 54 inches in diameter. The installation of these devices is relatively straightforward when the structure, e.g. a power cable, is initially installed, as they can be attached to the cable prior to it being elevated. There is, however, a need to maintain such installations on a routine basis and for retrofitting aerial marker devices to existing cables which are otherwise unmarked and constitute a serious hazard to aircraft ground or water navigation.

The conventional manner of servicing overhead power lines is to disconnect the line from the power supply and lower it to the ground so that maintenance can be performed. This however interrupts the power distribution, causing a loss in revenue, requires access to the line, and is time-consuming and therefore costly. An alternative approach is to utilize a cart that travels along the power cables but this approach rarely permits servicing to be done while the cable is transmitting power. However, this technique tends to be rather slow, access to the cart is relatively hazardous and therefore restricted, and the size of the cart is dictated by the limited working environment so that large objects cannot readily be carried. A further technique that overcomes some of these problems is shown in our issued U.S. Pat. No. 4,637,575 in which a helicopter is equipped with a platform and is electrically connected to the power line while work is performed on it. This procedure enables rapid access to remote areas and the servicing and maintenance of the power line without interruption of the power. This technique can also be used to install conventional aerial marker devices but due to the size of the conventional devices they can only be transported one at a time to the power line. This of course is also true when a cart is used on the power lines and because of the restricted access to the carriage, it is impractical to attempt to attach aerial marker devices with that technique.

A further problem that exists with the installation of aerial marker devices from the helicopter is that the diameter of the devices presents a relatively large surface area which is subjected to the downwash from the helicopter blades. The weight, size and load induced on the aerial marker device is substantial, making it difficult for the installer to hold on the aerial marking device during transition from the ground to the work site, and manoeuvre the aerial marker device in position and secure it to the cable.

There is, therefore, a need to provide a aerial marker device that may be readily transported and installed and it is therefore an object of the present invention to provide such a device in which the above disadvantages are obviated or mitigated.

In general terms, the present invention provides a aerial marker device that includes a bracket for attachment to an elevated structure such as a cable and a flexible envelope having an outer surface to define the outer surface or shape of the aerial marker device. The envelope is inflatable to increase its internal volume after it has been attached to the bracket so that the outer surface conforms to the desired configuration of the aerial marker device.

The inflation of the envelope permits a number of envelopes and attachment brackets to be transported at the same time and for the aerial marker device preferably to be assembled in a deflated condition and installed on the cable. Upon installation, the inflation of the envelope may proceed with the induced load being supported by the cable.

It is preferred that the inflation is performed by an expandable foam which subsequently solidifies to provide a rigid support for the envelope.

An embodiment of the invention will now be described by way of example only, with reference to the accompanying drawings, in which FIG. 1 is a general representation of a power line installation;

Figure 1:
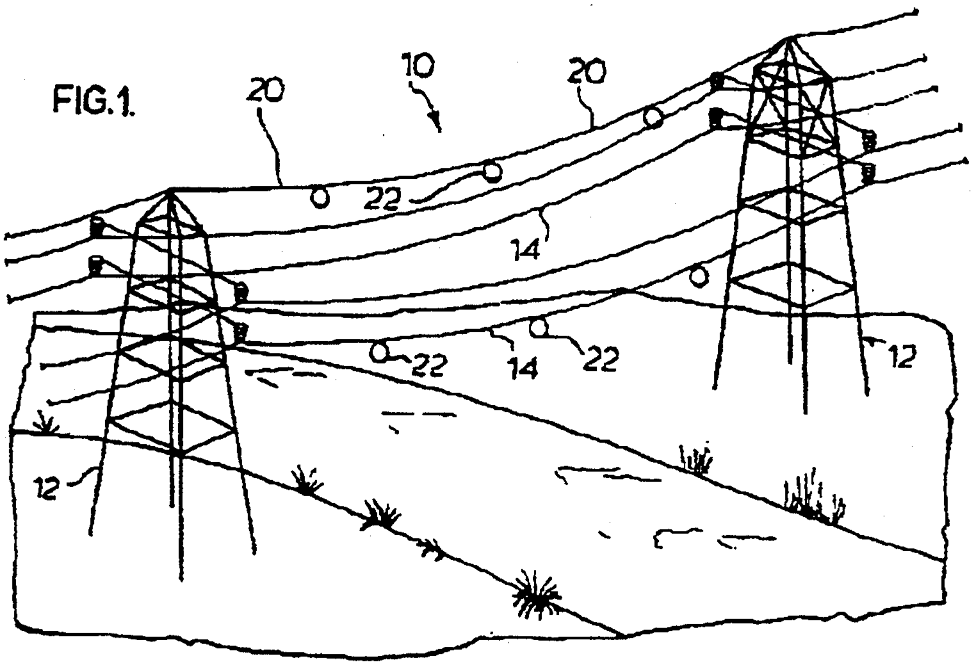

Referring therefore to FIG. 1, a high-tension power line installation 10 includes spaces support structures 12 and a power line bundle including conductors 14 extending between insulators 16 mounted on longitudinal arms 18 of the tower. A ground wire 20 conventionally extends from the apex of each of the supporting structures above the conductors 14.

The spans between adjacent structures can extend over several hundred feet and accordingly aerial marker devices 22 are attached at spaced intervals along the conductors. The spacing and location of the aerial marker devices will vary from installation to installation according to well-known practices and regulations.

Figure 2:
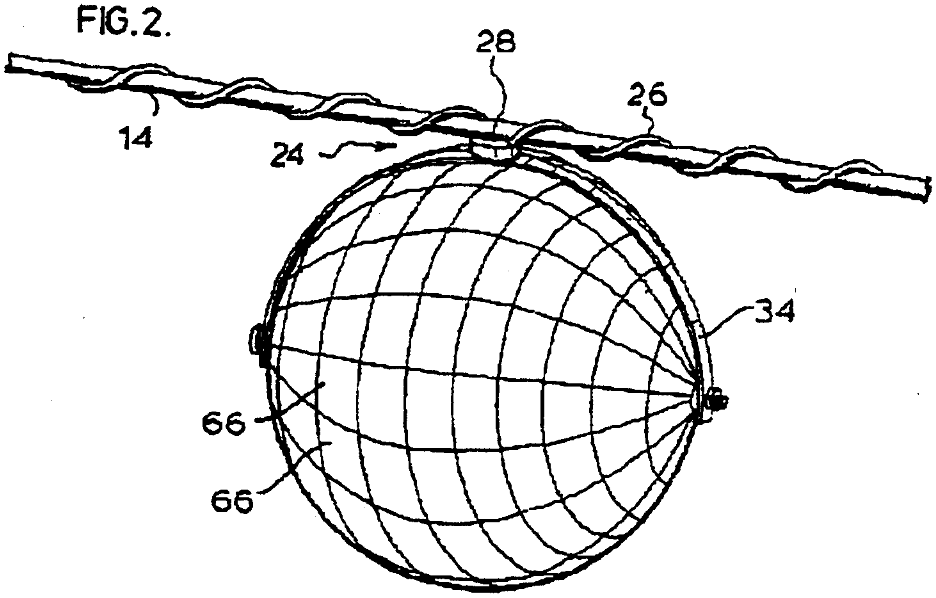
FIG. 2 is a general perspective view of a aerial marker device installed on a power line shown in FIG. 1.
Figure 3:
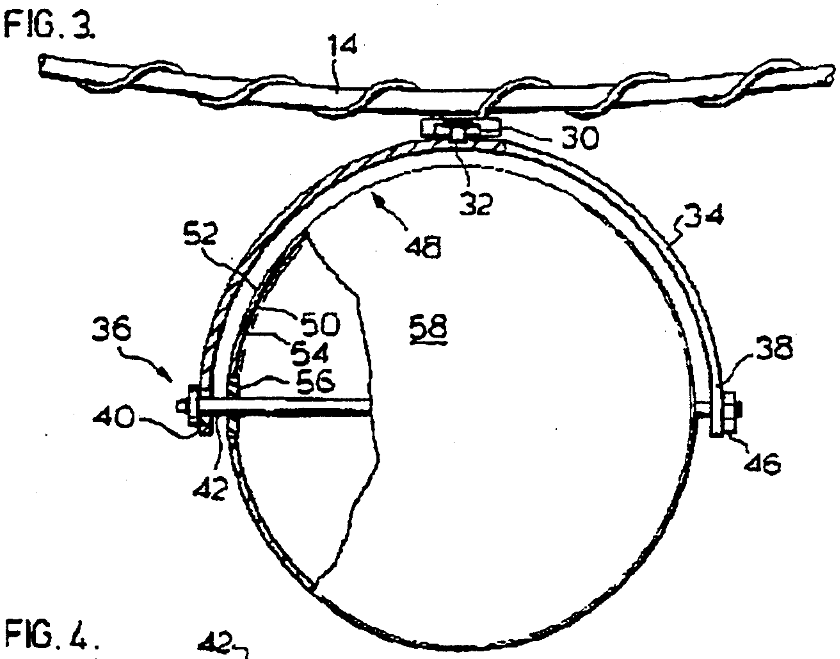
FIG. 3 is a view of FIG. 2 partly in section of the device shown in FIG. 2.

Referring therefore to FIG. 2, the aerial marker device 22 is secured to the conductor 14 or ground wire 20 by a bracket 24. In the preferred embodiment, the bracket 24 includes a pair of oppositely extending helically wound arms 26 which circumscribe the conductor 14 and are connected to a support disk 28. The helical arms 26 distribute the load of the aerial marker device 22 over a substantial length of the conductor 14 and avoid localized stresses being induced in the conductor that could lead to premature failure.

The support disk 28 includes a bearing 30 which rotatably supports a pin 32 secured to a semicircular bracket 34 so that the bracket 34 may pivot through 360° about a vertical axis relative to the conductor 14.

The bracket 34 is made from a flat strip and diametrically opposed ends of the bracket 34, indicated at 36 and 38 respectively, carry a bearing 40. An axle 42 passes through the bearings 40 and, as can best be seen in FIG. 6, has an enlarged head 44 at one end to limit axial movement relative to the end 36 in one direction. The opposite end of the axle 42 is secured by a nut 46. The axle 42 is thus free to rotate about a generally horizontal axis relative to the bracket 34.

The axle 42 passes through a diameter of a aerial marker device body 48 that comprises an envelope 50 having an outer surface 52 and an interior surface 54. The envelope 50 is formed from a flexible material which is preferably inelastic so that the exterior surface 52 is of fixed surface area. A suitable material is that known as "hypalon" sold by Dupont although other similar materials may be used. In certain installations, conductivity of the envelope may be specified in which case it is preferred that the material of envelope 50 is rendered electrically conductive. Accordingly a woven material incorporating stainless steel or other conductive material may be used. The envelope 50 is secured to annular supports 56 located at its polar regions and the supports 56 are snugly received on the axle 42. The envelope 50 is supported by a foam core 58 which completely fills the interior of the envelope 50.

Figure 4:
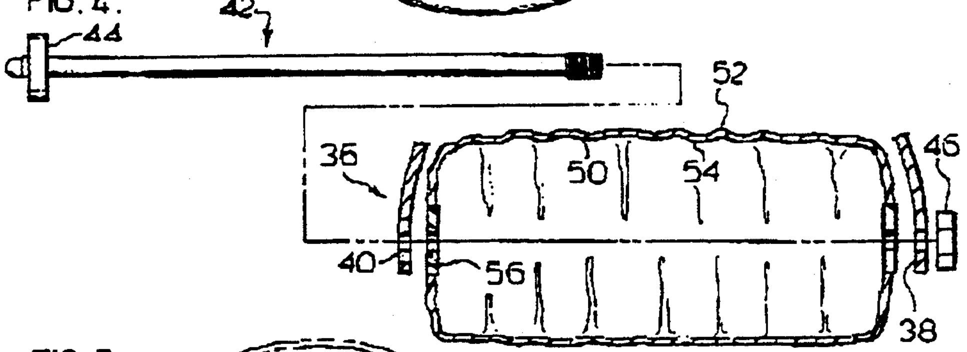
FIG. 4 is a view showing the components forming the aerial marker device shown in FIG. 2 in a disassembled configuration.
Figure 5:
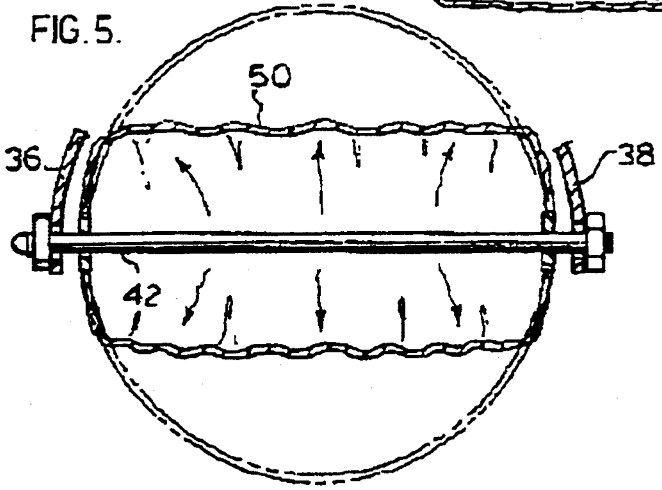
FIG. 5 is a view similar to FIG. 4 showing the assembled aerial marker device.

As is best seen in FIGS. 4 and 5, the aerial marker device 22 is initially assembled with the envelope 50 in a deflated and unsupported condition. In this condition, the internal volume of the envelope is minimized to facilitate transport and installation. The axle 42 is then passed through the bearing at the end 36 through the annular disks 56 at opposite ends of the envelope to be received and secured in the opposite end 38 of the arm 34. The axle 42 is then secured by the nut 46. This assembly may be performed either prior to installation of the bracket on the conductor 14 or subsequent thereto. With the aerial marker device installed and the envelope in the deflated condition, the foam forming the core 58 may be injected into the interior of the envelope 50 causing it to expand as the interior volume increases. The expansion will continue until the shape determined by the configuration of the envelope is attained.

Figure 6:
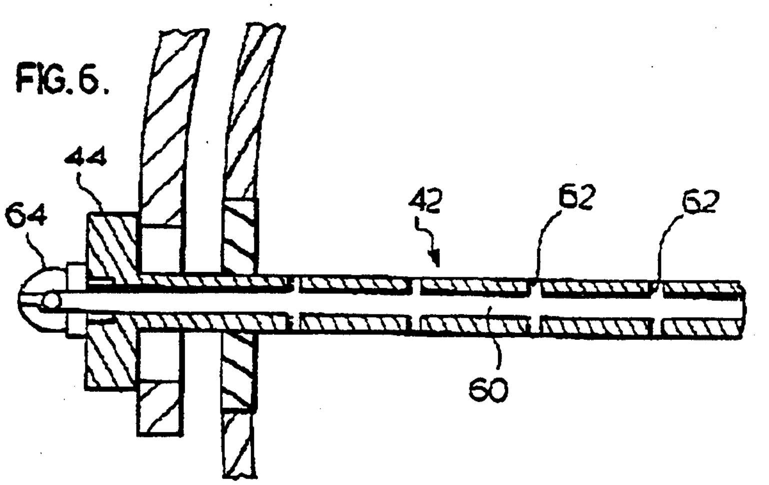
FIG. 6 is a view on an enlarged scale showing a portion of the assembled components shown in FIG. 5.

As can be seen in FIG. 6, injection of the foam is facilitated by an internal axial passage 60 that extends from the enlarged head 44. The passage 60 is intersected by cross-drillings 62 at spaced locations along the axle 42. A nipple 64 closes the end of the passage 60 and includes a check valve to prevent flow out of the passage 60. The nipple 64 is of a suitable form compatible with the container in which foam is supplied to allow the injection of the foam into the interior of the envelope 50.

The foam may be any convenient expansible and curable foam and is preferably a two-part foam supplied in separate canisters and mixed as it is injected. Suitable foams are available from Sealed Air Corporation of Danbury, Conn. under the trade name Instapak.

Figure 7:
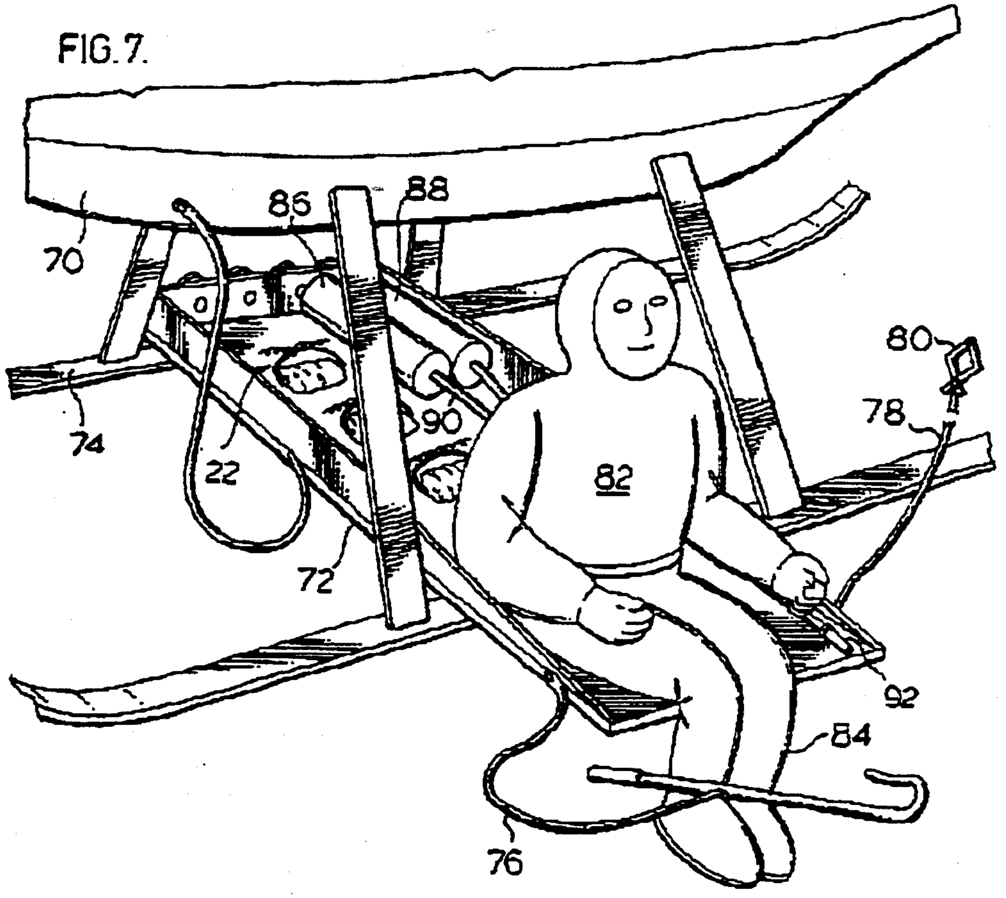
FIG. 7 is a schematic representation of the steps involved in installing a aerial marker device shown in FIGS. 2–6.

To install the aerial marker devices 22, it is preferred to utilize a helicopter platform as shown in our earlier U.S. Pat. No. 4,637,575 noted above to carry the two-part foam pack and a supply of brackets and envelopes. As shown schematically in FIG. 7, a helicopter 70 includes a platform 72 attached to the skids 74 of the helicopter 70. The platform 72 is electrically connected to the helicopter 70 and has a wand 76 and a cable 78 with clamp 80 connected to the platform for manipulation by an operator 82. The operator 82 is clad in a protective conducting suit 84 which is also electrically connected to the platform 72.

A pair of canisters 86,88 are located on the platform 80 and each contain separate components of a curable foam. The canisters 86,88 are connected through hoses 90 to a dispensing nozzle 92 positioned adjacent the operator 82.

Platform 80 also holds the components for a number of aerial marker devices 22 consisting of brackets 24, axles 42 and deflated envelopes 50. A number of aerial marker devices 22 may conveniently be carried at one time to increase the efficiency of the installation. It is preferred that the components are assembled into deflated aerial marker devices before flying to maximize the use of airborne time. However, if space on the platform does not permit this, then they can be assembled in flight as they are used.

To install the aerial marker devices 22 on the power line 14 or ground line 20, the helicopter 70 hovers to position itself adjacent to the conductor 14 in the location where the ball 22 is to be attached. The helicopter then moves adjacent to the bundle 13 and electrically connects the conductor 14 or ground wire 20 and helicopter 70 by use of the wand 76. As described in the earlier granted U.S. Pat. No. 4,637,535, the potential of the helicopter 70 and power line 14 are equalized by holding the wand 76 in advance of the lineman 82 as the helicopter approaches the conductor 14 laterally. An arc is established to equalize the potential and the clamp 80 may then be attached to the conductor 14 to establish a secure releasable connection through cable 78.

The deflated aerial marker device 22 is then attached to the conductor by feeding the arms 26 around the conductor 14. With the aerial marker device attached, the dispensing nozzle 92 is applied to the nipple 64 on the axle 42 to inject foam components into the interior of envelope 50. When sufficient charge has been injected, the nozzle may then be removed, the envelope will be expanded to its desired shape, and eventually the foam will cure to provide the rigid core 50. To relocate the helicopter, the wand 76 is applied to the conductor 14 and the clamp 80 is released. The helicopter 70 may then move away from the conductor 14 with the wand 76 being directed toward the conductor to facilitate debonding. This procedure may be repeated at each location of the bundle at which a device is to be attached until all the components are used.

It will be seen with this procedure that a number of aerial marker devices can be attached on each flight and that the effect of the downwash from the rotors is minimized by attaching the devices prior to inflation. Moreover, the devices are easier to handle by virtue of their reduced bulk. It will also be appreciated that a similar procedure can be used with non-power conducting cables or other elevated structures. However, the in situ attachment to live high voltage power transmission lines is believed to be the most demanding application and therefore illustrative of the versatility of the procedure and apparatus.

It will also be appreciated that the aerial marker devices may be attached with other techniques, such as the cable cart or from the ground when initially installing the power line and that the inflatable aerial marker device offers similar advantages in terms of ease of transportation and extended work periods between restocking the workstation with aerial marker devices.

If necessary due to space limitations, the aerial marker devices may be assembled from components carried on the platform whilst the helicopter is airborne but it is generally preferable to maximize the utilization of flight time so that preassembly of the components is preferred. However, for other installation techniques, assembly at the attachment location may be beneficial.

The support of the body on the bearing 48 enables the body to rotate about a horizontal axis and the pin 38 allows the body to rotate about a vertical axis. This reduces the wind load exerted by the aerial marker device on the conductor but also provides a rotating outer surface 50 that may be used to enhance the visibility of the aerial marker devices. In the preferred embodiment shown in FIG. 2, the expanded envelope defines a plurality of facets 66 which are treated in contrasting colours. This may be black and white, or high-visibility/low-visibility or even reflective/non-reflective alternating patterns. In this way, as the aerial marker device rotates a visually perceptible signal is provided.

Although the preferred embodiment shows the body generally spherical in an expanded form, it will be appreciated that other forms may be provided by the envelope. It may, for example, utilize a rhomboid configuration or a pair of opposed cones. In each case, the envelope 50 is constructed to define the shape of the aerial marker device in the expanded condition.

It is preferred that the material of the envelope is inelastic and thus constrains the foam core to a predetermined shape as the envelope expands. It will, however, be apparent that elastic materials may be utilized which will define the general shape of the aerial marker device but the exact dimensions will be determined by the degree of inflation from the foam. It is believed, however, that an inelastic material is preferred so that accurate control over the final size and shape of the marker aerial marker device can be maintained. If preferred, individual charges of foam may be provided to control the charge administered and to inhibit overinflation or a pressure relief valve fitted to the body.

Although foam has been described as the preferred form of expansion, it will also be apparent that other inflation medium, such as gas, may be used to expand the envelope. Support for the envelope may then be provided by a coating applied to the interior surface 54 which cures upon exposure to an inflating gas. The envelope 50 is then supported by the solidified coating providing a rigid body.

It will also be apparent that alternative attachment forms may be provided than the helical arms 26. For example, a jawed clamp may be utilized and if preferred, the rotational mounting of the bracket to the support disk may be deleted. Similarly, the rotation of the aerial marker device on the spindle is preferred but is not essential.

We claim:

1. An aerial marker for attachment to an elevated cable extending between a pair of ground supported towers to indicate the presence of the cable, said marker comprising an attachment bracket and a body secured to said attachment bracket, said attachment bracket including a clamp for engaging said cable intermediate said towers and for securing said marker to said cable and a support member extending between said clamp and said body to maintain said body spaced from said cable, said support member including an axle to permit rotation of the body relative to the bracket about an axis spaced from and parallel to said cable and a pivotal connection to permit rotation of said body about an axis orthogonal to said axis of rotation of the body relative to the bracket, said body having an outer envelope of flexible material expandable from a collapsed condition to a predetermined shape upon attachment to said structure by application of an inflation medium to the interior thereof to permit transportation of said marker to said cable in a collapsed condition.

2. A marker according to claim 1 wherein said inflation medium is a curable foam that supports said envelope and provides a solid core for said body after application.

3. A marker according to claim 1 wherein said flexible material is inelastic.

4. A marker according to claim 3 wherein said inflation medium is a curable foam that supports said envelope and provides a solid core for said body after application.

5. A marker according to claim 1 wherein said support member is semi-circular and said axle extends across a diameter of said body between opposite ends of said support member.

6. A marker according to claim 5 wherein said axle is rotatably supported by said support member.

7. A marker according to claim 6 wherein said inflation medium is a curable foam that supports said envelope and provides a solid core for said body after application, said core being connected to said axle for rotation therewith.

8. A marker according to claim 7 wherein said axle includes an injection port to permit injection of said foam into said envelope.

9. A marker according to claim 8 wherein said injection port extends axially along said axle from one end thereof.

10. A marker according to claim 1 wherein said clamp includes at least one pair of helically wound arms extending in opposite directions to encompass said cable.

11. A marker according to claim 1 wherein visually distinct areas are formed on an outer surface of said envelope.

12. A marker according to claim 11 wherein said body is rotatable relative to said support member.

13. A marker according to claim 12 wherein said body is spherical.

14. A marker according to claim 1, wherein said predetermined shape of said body is generally spherical.

15. A method of indicating the location of an elevated cable extending between a pair of ground supported towers, comprising the steps of transporting to said cable by an airborne vehicle at least one marker, each comprising an attachment bracket and an expandable envelope secured to said attachment bracket, hovering said airborne vehicle adjacent said cable at a location at which said marker is to be attached, attaching said attachment bracket to said cable at said location with said envelope deflated, and subsequently inflating said envelope to define a body of predetermined shape.

16. A method according to claim 15 including the step of injecting an inflation medium into said envelope to effect inflation of the envelope.

17. A method according to claim 16 wherein said inflation medium is a curable foam and said method includes the step of allowing said foam to cure within said envelope to provide a rigid core to support said envelope.

18. A method according to claim 17 including the step of dispensing said foam from a supply thereof carried by said vehicle.

19. A method of attaching a marker, which includes an attachment bracket and a flexible envelope secured to said bracket, to an elevated cable comprising the steps of transporting said marker to a location adjacent to said cable by an airborne vehicle, hovering said vehicle at said location, attaching said bracket to said cable while said envelope is deflated, and inflating said envelope from a source of inflation medium carried by said vehicle.

20. A method according to claim 19 including the step of securing said envelope to said bracket whilst airborne.

21. A method according to claim 20 wherein said step of securing said envelope is performed at said location.

22. A method according to claim 19 including the step of assembling said envelope to said bracket.

23. A method according to claim 22 wherein said envelope is secured to said bracket by inserting an axle through spaced apertures in said envelope and said bracket.

24. A method according to claim 23 wherein said envelope is inflated subsequent to the insertion of said axle.

25. A method according to claim 24 wherein said inflation medium is injected into said envelope through ports provided in said axle.

26. A method according to claim 23 wherein said bracket is attached to said cable subsequent to the insertion of said axle.

27. A method according to claim 19 including the step of attaching an electrical conductor that is electrically connected to said vehicle to said cable prior to attachment of said bracket to cable to dissipate any electrical potential difference that may exist between said vehicle and said cable.

28. A method according to claim 27 including the step of securing said envelope to said bracket whilst airborne.

29. A method according to claim 28 including the step of assembling said envelope to said bracket.

30. A kit for providing a marker on an elevated cable extending between a pair of ground supported towers to facilitate perception of said cable, said kit comprising an attachment bracket including a clamp adapted to be connected to said cable intermediate said towers and a support member to be connected to a flexible envelope, said support member including securing means for securing said envelope to said bracket to permit rotation of the envelope relative to the bracket about an axis spaced from and parallel to said cable and a pivotal connection to permit rotation of said envelope about an axis orthogonal to said axis of rotation of said envelope relative to said bracket, said flexible envelope being inflatable to a predetermined shape.

31. A kit according to claim 30 including inflation means associated with said envelope to permit inflation thereof to said predetermined shape.

32. A kit according to claim 31 wherein said securing means includes an axle adapted to be inserted through spaced apertures in said envelope and said bracket to connect said envelope and bracket.

33. A kit according to claim 32 wherein said axle includes a supply port to permit injection of an inflation medium into said envelope after insertion of said axle.

34. A marker according to claim 30, wherein said predetermined shape is generally spherical.

* * * * *